United States Patent [19]

Ames et al.

[11] Patent Number: 5,675,680
[45] Date of Patent: *Oct. 7, 1997

[54] FIBER-OPTIC CONNECTOR

[75] Inventors: Gregory H. Ames, Gales Ferry; Roger L. Morency, Voluntown, both of Conn.

[73] Assignee: The United States of America as represented by the Secretary of the Navy, Washington, D.C.

[*] Notice: The term of this patent shall not extend beyond the expiration date of Pat. No. 5,521,996.

[21] Appl. No.: 345,957

[22] Filed: Nov. 25, 1994

[51] Int. Cl.$^6$ ........................................ G02B 6/40
[52] U.S. Cl. .................. 385/54; 385/75; 385/53; 385/59; 385/71
[58] Field of Search .................. 385/54, 59, 60, 385/85, 78, 35, 53, 55, 71, 72, 75

[56] References Cited

U.S. PATENT DOCUMENTS

| | | | |
|---|---|---|---|
| 3,917,383 | 11/1975 | Cook et al. | 385/54 |
| 4,027,938 | 6/1977 | Lewis | 385/54 |
| 4,140,367 | 2/1979 | Makuch et al. | 385/59 |
| 5,394,493 | 2/1995 | Ames | 385/78 X |
| 5,521,996 | 5/1996 | Ames et al. | 385/75 |

Primary Examiner—Phan T. H. Palmer
Attorney, Agent, or Firm—Michael J. McGowan; Michael F. Oglo; Prithvi C. Lall

[57] ABSTRACT

There is presented a fiber-optic connector and a method of making same. The connector comprises a plurality of ferrules, each of the ferrules having extending centrally therethrough a single optical fiber. The connector further includes structure abutting at least a portion of the ferrules for exercising a radially compressive force on the ferrules for urging the ferrules into a configuration in which said ferrules are coparallel and nested so as to form a stable bundle which in transverse section is substantially axisymmetrical, and retaining the ferrules in the configuration. The connector still further includes alignment structure for angular positioning of said ferrules in said connector in said transverse section about a nominal longitudinal axis of said bundle for registry of the connector with a second connector of complementary configuration.

10 Claims, 9 Drawing Sheets

FIBER-OPTIC CONNECTOR

STATEMENT OF GOVERNMENT INTEREST

The invention described herein may be manufactured and used by or for the Government of the United States of America for governmental purposes without the payment of any royalties thereon or therefor.

CROSS-REFERENCE TO RELATED PATENT APPLICATIONS

This patent application is co-pending with four related patent applications entitled An Electrical And Fiber-Optic Connector, Ser. No. 08/345,049 now U.S. Pat. No. 5,521, 996, Fiber-Optic Bundle and Collimator Assembly, Ser. No. 08/287,029 now U.S. Pat. No. 5,394,493, Fiber-Optic Rotary Joint With Bundle Collimator Assemblies, Ser. No. 08/287,027 now U.S. Pat. No. 5,442,721, and Assembly Method For Fiber-Optic Bundle Collimator Assemblies, Ser. No. 08/287,028 now U.S. Pat. No. 5,400,429.

BACKGROUND OF THE INVENTION

(1) Field of the Invention

This invention relates to fiber-optic connectors and is directed more particularly to a connector having therein a plurality of fiber-optic ferrules, each ferrule having therein a single optical fiber, and to a method for making same.

(2) Description of the Prior Art

Single channel fiber-optic connectors are well known. Precision ceramic ferrules, as shown in FIGS. 1 and 2 herein, have a central lengthwise extending tube adapted to hold a single optical fiber and are made with high precision. The ferrules are inexpensive and made in large quantity. The concentricity of the central tube, the diameter thereof, and the diameter of the ferrules are extremely consistent, permitting precision alignment of ferrules, and thereby the optical fibers therein. A split cylindrical sleeve, as shown in FIGS. 3 and 4, is commonly used to align two ferrules. Because of the precision with which the ferrules are manufactured, alignment of the ferrules simultaneously accomplishes alignment of the optical fibers. In practice, the offset of the end-to-end abutting of the optical fibers laterally, that is, in directions perpendicular to the axes of the fibers, is but a few microns. To insure that the alignment of ferrules is not hindered, the two ferrules float, relative to an outer connection shell, on springs (not shown).

In multi-channel connectors, virtually the same construction is used. A plurality of single fiber ferrules float independently on springs and are individually aligned and connected with matching ferrules of another connector by independent sleeves. The result is a rather large connector juncture, inasmuch as the individually floating ferrules cannot be closely packed. Further, the joining of connectors is a laborious process in which each pair of optical fibers is connected together, pair by pair. There is thus a need for a connector adapted to simultaneously connect multiple optical fibers with low loss and high reliability, that is, with extreme precision, which connector is of a miniature size.

SUMMARY OF THE INVENTION

An object of the invention is, therefore, to provide a fiber-optic connector having a plurality of ferrules closely packed and accurately positioned for alignment with a second connector of complementary configuration.

With the above and other objects in view, as will hereinafter appear, a feature of the present invention is the provision of a multi-channel fiber-optic connector comprising a plurality of ferrules, each of the ferrules having extending centrally therethrough a single optical fiber. The connector further comprises means abutting peripherally disposed ferrules for exercising a radially compressive force on the ferrules for urging the ferrules into a configuration in which the cylindrical ferrules are coparallel and nested so as to form a stable bundle which in transverse section is axisymmetrical, and retaining the ferrules in such configuration. The connector further includes alignment structure for alignment of the connector with a second connector of complementary configuration.

In accordance with a further feature of the invention, there is provided a method for making a multi-channel fiber-optic connector, the method comprising the steps of positioning a plurality of fiber-optic single-channel ferrules side by side, each of the ferrules having a single tube extending lengthwise centrally therethrough, and surrounding the ferrules with a sleeve member operative to engage peripheral ones of the ferrules to exercise a radially compressive force on the ferrules to urge the ferrules into a configuration in which the cylindrical ferrules are coparallel and nested so as to form a stable bundle which in transverse section is axisymmetrical. The ferrules are then locked in position in such configuration. An azimuthal alignment structure is affixed to the connector to facilitate alignment of the connector with a second connector of complementary configuration. The method includes the further steps of inserting an optical fiber in each of the ferrule tubes, fixing the optical fibers in the tubes, removing portions of the fibers extending from face portions of the ferrules, and polishing the face portions for precision abutment with complementary faces of ferrules of a second connector.

The above and other features of the invention, including various novel details of construction and combinations of parts, will now be more particularly described with reference to the accompanying drawings and pointed out in the claims. It will be understood that the particular devices and methods embodying the invention are shown by way of illustration only and not as limitations of the invention. The principles and features of the invention may be employed in various and numerous embodiments without departing from the scope of the invention.

BRIEF DESCRIPTION OF THE DRAWINGS

Reference is made to the accompanying drawings in which are shown illustrative embodiments of the invention, from which its novel features and advantages will be apparent.

In the drawings.

DESCRIPTION OF THE PREFERRED EMBODIMENTS

Figure 5:
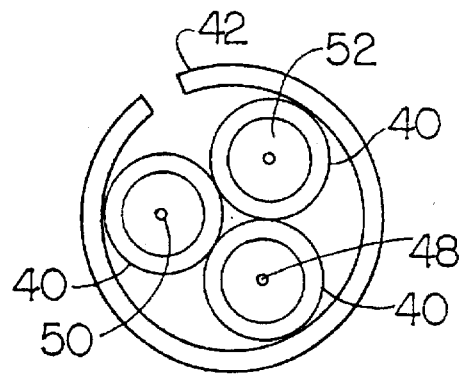
FIG. 5 is an end view of a multi-channel connector illustrative of an embodiment of the invention.
Figure 6:
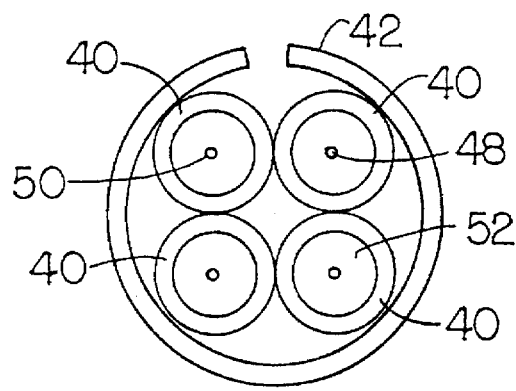
FIGS. 6-10 are end views of alternative embodiments of the invention.
Figure 8:
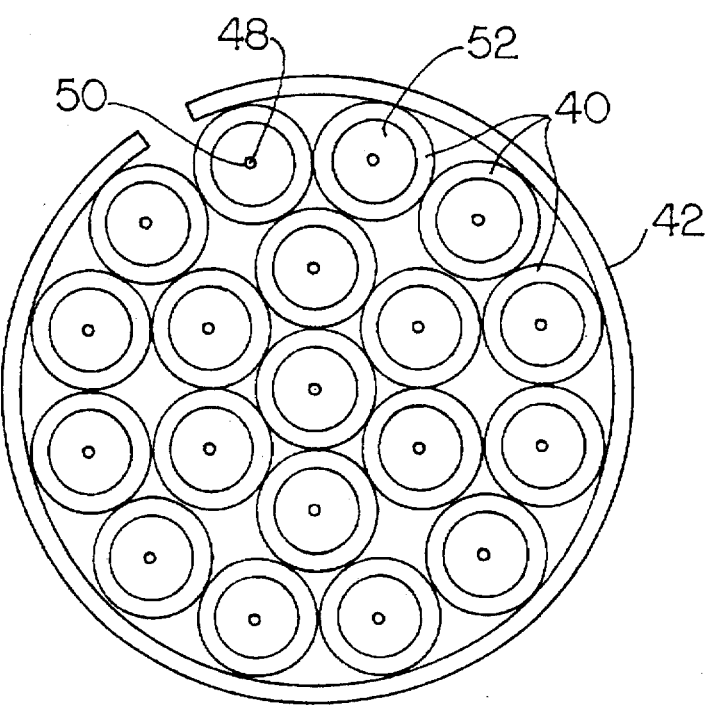
Figure 7:
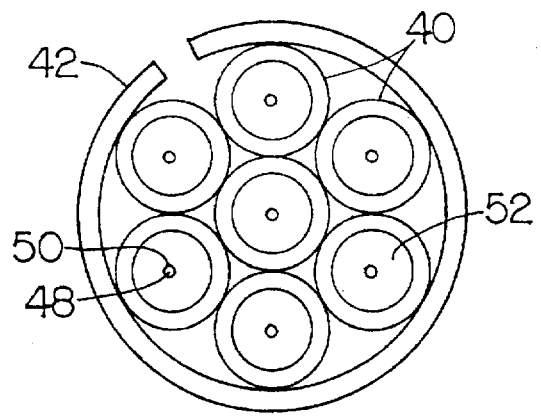

Referring to FIG. 5, it will be seen that a fiber-optic connector, illustrative of an embodiment of the invention, includes a plurality of known single channel ferrules 40. The plurality of ferrules 40 are formed into a compact assembly by squeezing a group of side-by-side single channel ferrules together with an inwardly directed radial force applied from all directions around the group of ferrules. The ferrules 40 are thereby caused to align themselves into a predictable configuration in which the cylindrical ferrules are coparallel and nested so as to form a stable bundle which in transverse section is axisymmetrical. In FIG. 5, three ferrules are shown compressed together in such a configuration. FIGS. 6, 7 and 8 show embodiments having, respectively, four, seven and nineteen single-channel ferrules. In each instance, the configuration of ferrules is predictable and the ferrules are nested such that the bodies form a stable, axisymmetrical bundle.

Figure 9:
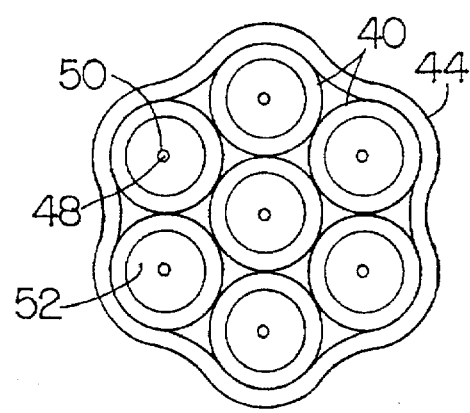

The radially compressive force required to squeeze ferrules 40 into a close-packed configuration may be provided by a split-sleeve 42 (FIGS. 5–8) acting as a leaf-spring engaging all the peripheral ferrules of a bundle and urging the ferrules inwardly, or a shrink-film band 44 (FIG. 9), or elastomeric bands (not shown), or the like.

While the inwardly-directed compressive force causes the ferrules to form a stable bundle, such compressive force is not always sufficient to preclude twisting of the ferrules about the center of the bundle. Twist results in output beams that twist in space. In aforementioned U.S. patent application Ser. No. 08/287,028 U.S. Pat. No. 5,400,427, there is shown and described a method for assembling a group of ferrules in such manner as to avoid the possibility of twisting of the ferrules.

Figure 10:
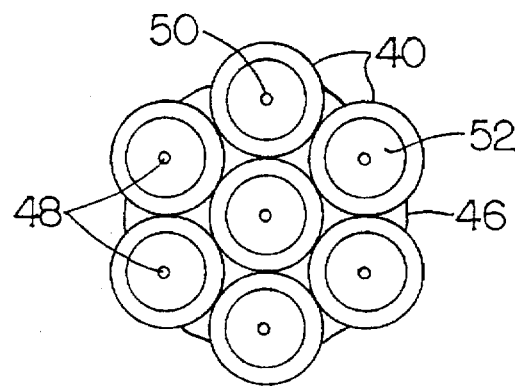
Figure 11:
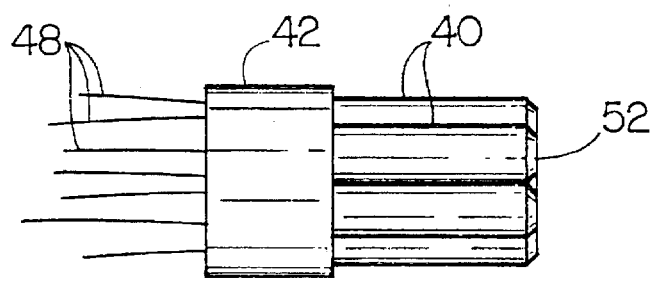
FIG. 11 is a side elevational view of the connector of FIG. 7.

Once the ferrules 40 are squeezed into position, the ferrules are held together by a retaining means, which may be the split-sleeve 42 (FIG. 11), shrink-film band 44 (FIG. 9), or other means used to apply inwardly-directed pressure on the ferrules. Either in conjunction with the squeezing means 42, 44, or independently thereof, a potting material, such as an epoxy 46 (FIG. 10), may be used to lock the ferrules 40 in place. The potting material 46 may be injected into the interstices between the ferrules such that the assembly of ferrules becomes one solid assembly. As shown in FIG. 10, if potting material 46 is relied upon as a sole ferrule retaining means, the radially compressive force means may be removed. If sleeve 42 is kept in place to serve as ferrule retention means, the sleeve is positioned around the rearmost portions of the ferrule (FIG. 11) leaving the forwardmost portions free for passage into an alignment sleeve, to be discussed hereinafter.

After the ferrules are assembled, and locked together, they are each loaded with optical fibers 48, which are potted in their respective tubes 50. After hardening of the potting material, the fibers 48 are cleaned off at ferrule faces 52, which are then polished. In view of the high accuracy of the diameters of ferrules 40, when fibers 48 are inserted into ferrules 40, potted and polished, the connector face has fibers 48 positioned in a highly accurate array.

Figure 1:
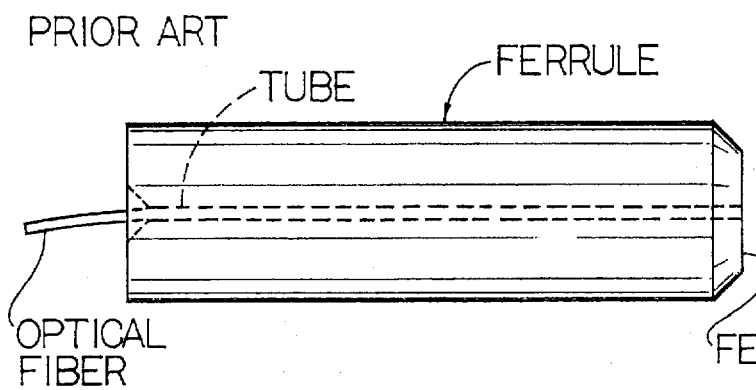
FIG. 1 is a side elevational view of a prior art single-channel ferrule.
Figure 2:
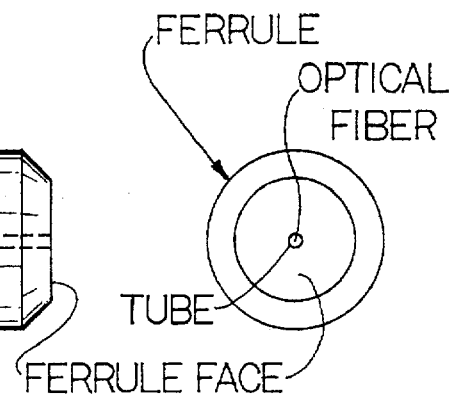
FIG. 2 is an end view of the ferrule of FIG. 1.
Figure 3:
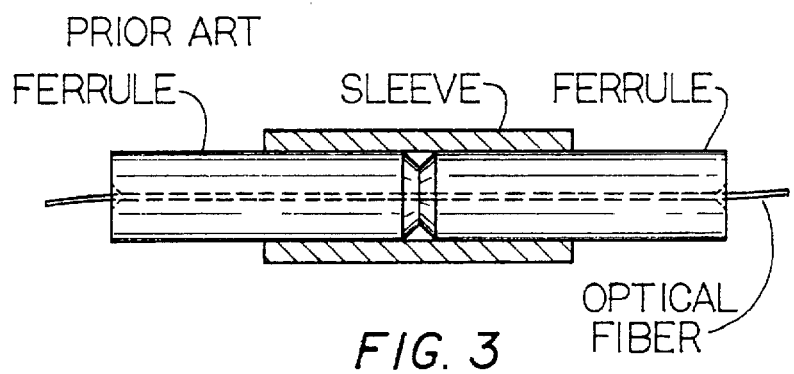
FIG. 3 is a partly side elevational, partly sectional, view of two of the prior art ferrules of FIG. 1 held together by a prior art sleeve.
Figure 4:
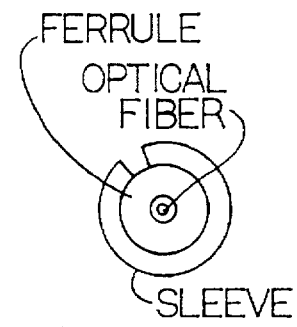
FIG. 4 is an end view of the ferrule and sleeve assembly of FIG. 3.
Figure 12:
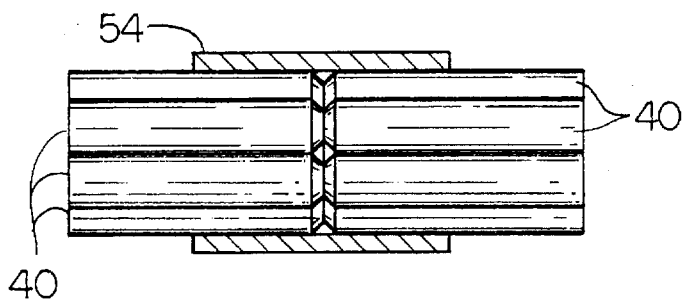
FIG. 12 is a side elevational view illustrating two connectors of the type shown in FIG. 11 held together by a sleeve.

Two such connectors have optical fibers 48 in matching positions. The connectors are then aligned by an alignment sleeve 54 (FIG. 12). However, while a simple alignment sleeve is sufficient in single-channel connectors (FIG. 3), it is lacking in the case of the multi-channel connectors disclosed herein. An alignment sleeve of the type used in single-channel connectors establishes longitudinal and lateral alignment of ferrules, but does not provide for azimuthal alignment, or "clocking" of the ferrules, necessary in multi-channel connectors.

Figure 13:
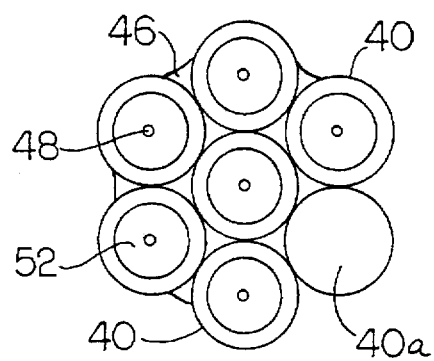
FIGS. 13 and 14 are end views of connectors, illustrating an alignment structure in the connectors.
Figure 14:
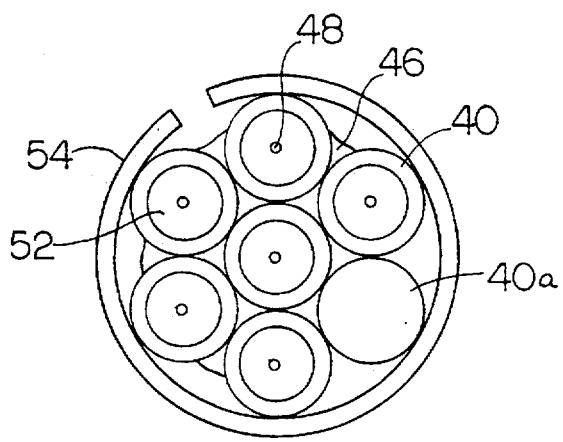
Figure 15:
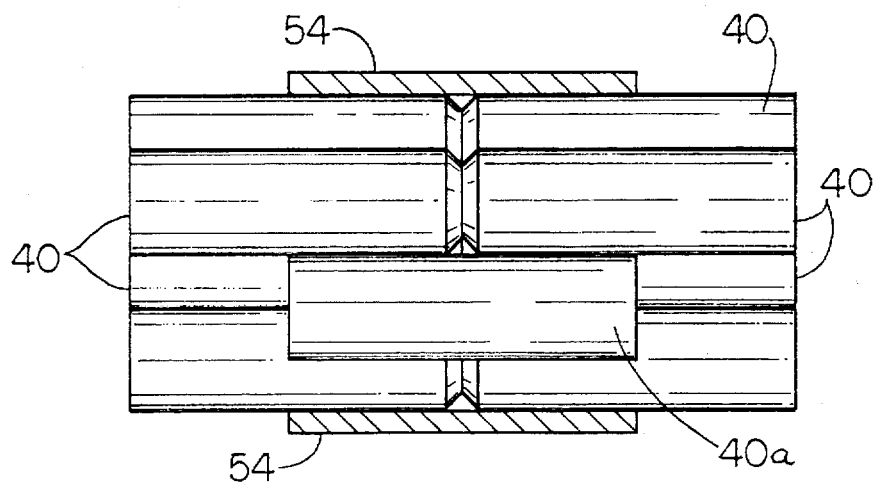
FIG. 15 is a side-elevational view of two connectors of the type shown in FIG. 14 held together by a sleeve shown in section.

The invention herein includes provision of azimuthal alignment structure. In FIG. 13, there is shown a bundle of ferrules 40 of the type shown in FIG. 9, but wherein the bundle is formed missing one ferrule from a normal pattern. When two connectors of the type shown in FIG. 13 are inserted into a split cylindrical alignment sleeve 54, a ferrule 40a, without an optical fiber therein, is inserted into the position of the missing ferrule, such that about half its length is housed in a first connector and about half its length is adapted to be received by a second connector (FIG. 15). The "blank" ferrule 40a thus serves as a precision pin, bringing the two connectors into azimuthal alignment.

Figure 16:
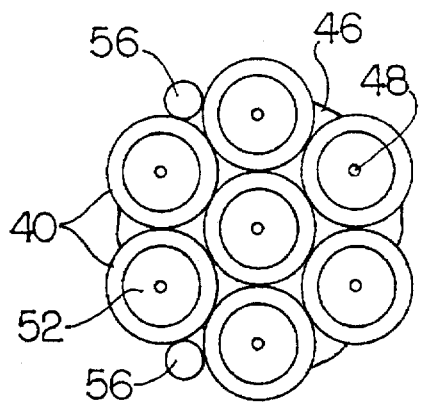
FIGS. 16–19 are illustrative of alternative embodiments of alignment structure.
Figure 17:
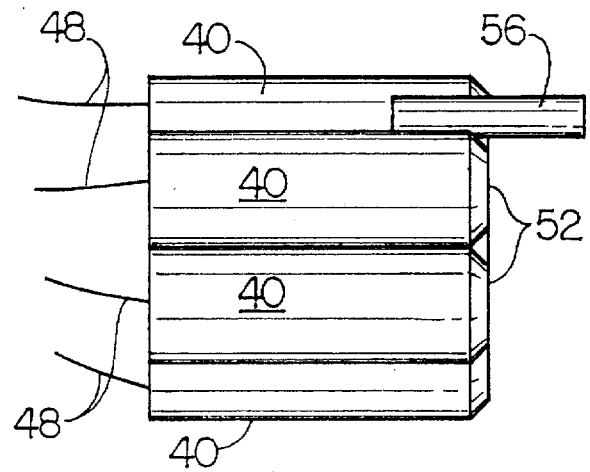
Figure 18:
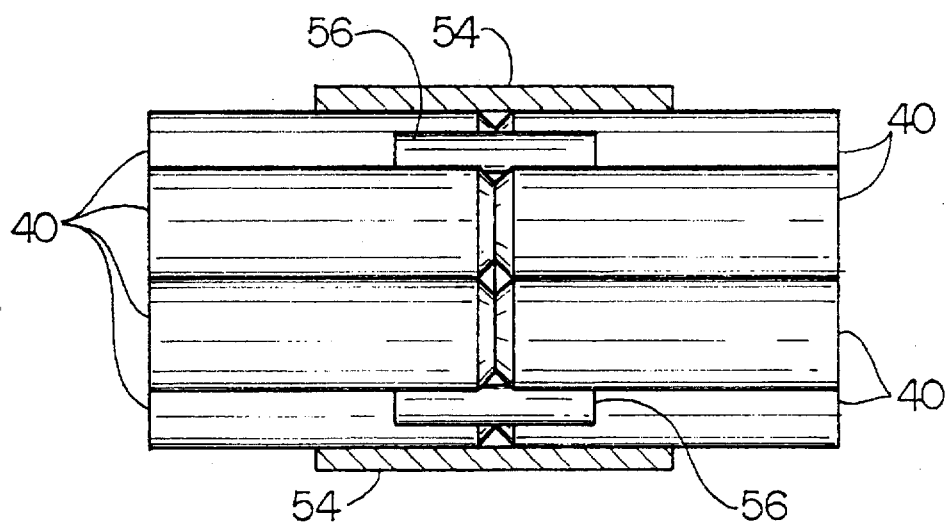

Alternatively, all ferrules may be retained as active ferrules and the necessary azimuthal alignment may be obtained by use of precision rods 56 which protrude from the face of one connector (FIGS. 16 and 17) and are adapted to be received in a matching recess in a mating connector (FIG. 18). When the connectors are inserted into alignment sleeve 54, rods 56 enter the matching recesses and the required azimuthal alignment is achieved.

Figure 19:
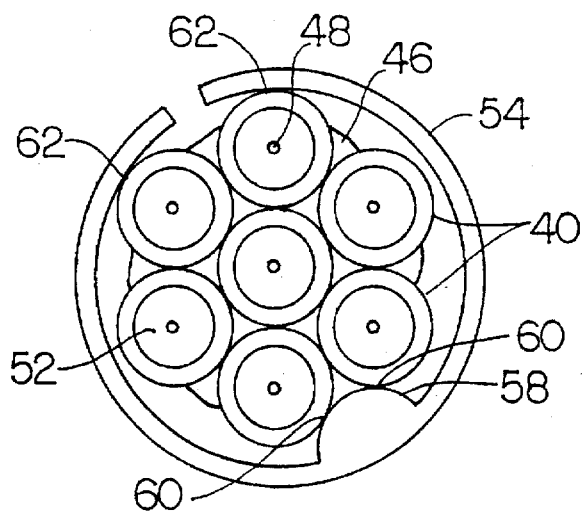

Another alternative embodiment of azimuthal alignment means is shown in FIG. 19. In this embodiment, alignment sleeve 54 is provided with a key 58 for providing a unique azimuthal alignment of ferrules. In the embodiment shown in FIG. 19, cylindrical split alignment sleeve 54 is provided with semi-cylindrical key 58 formed on the interior of the sleeve, preferably opposite to the split. The diameter of key 58 preferably is close to, but greater then, the diameter of the ferrules 40. When a bundle of ferrules is inserted into the alignment sleeve 54, key 58 aligns with one of the outer interstices between ferrules 40, in such manner as to form a two point contact 60 with the ferrules. The remainder of the alignment sleeve 54 will have two additional contact points 62 with the ferrules. The four contact points 60, 62 are sufficient to laterally interlock and align the two connectors, as well as provide for fine azimuthal alignment.

Figure 20:
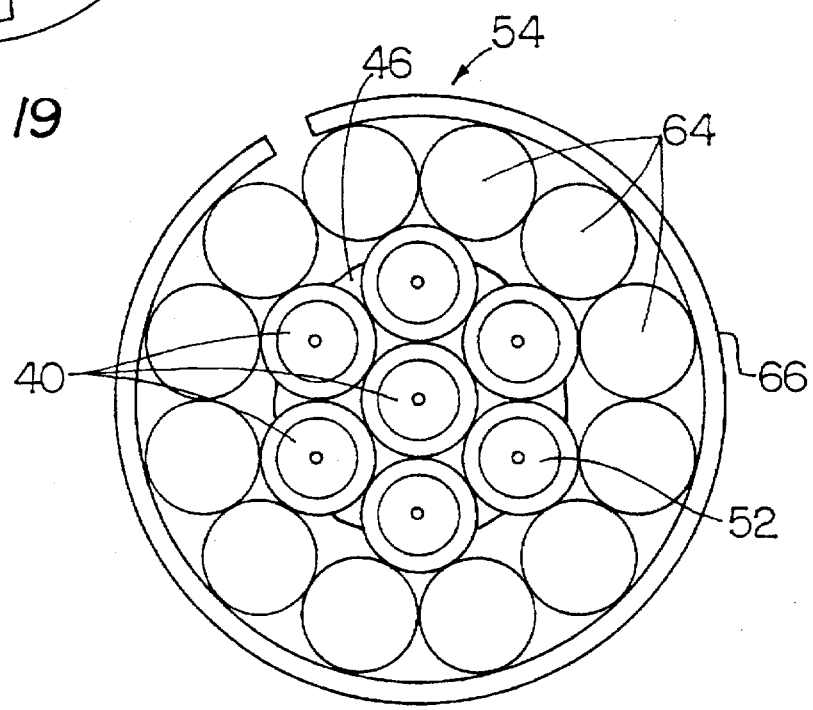
FIG. 20 is an end view of an alternative embodiment of alignment sleeve.
Figure 21:
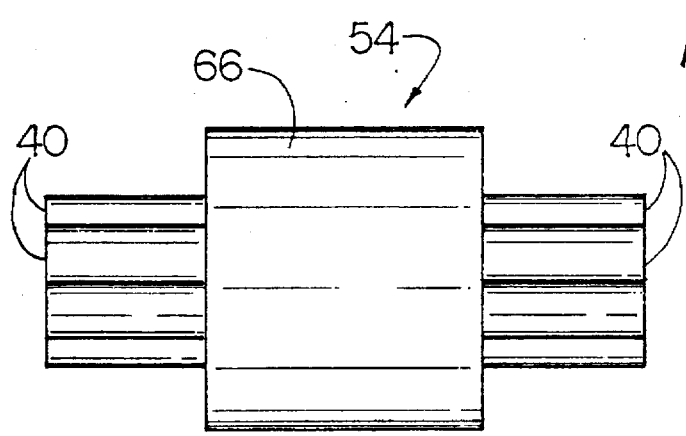
FIG. 21 is a side elevational view of two connectors of the type shown in FIG. 12 joined to each other by the alternative embodiment of alignment sleeve shown in FIG. 20.

In FIG. 20, there is shown still another alternative embodiment of azimuthal alignment means. In this instance, the alignment sleeve 54 comprises a ring of ferrule-like rods 64 radially compressed by a radial spring element 66. The diameter of the rods 64 precisely matches the diameter of the ferrules 40. The number of rods 64 in the ring, twelve shown in FIG. 20, allows the insertion of a seven ferrule bundle. When two connectors of the type shown in FIG. 20 are inserted into alignment sleeve 54 (FIG. 21), both lateral and fine azimuthal alignment is established.

Once polished, all of the optical fiber faces lie in a predicable plane so that when two ferrules are abutted in an alignment sleeve the two faces come flush together with minimal gaps therebetween. A typical single-mode fiber experiences approximately a 0.1 dB loss for a gap between fiber faces of 30 microns. The predictable polished plane may be perpendicular to the axes of the ferrules or, alternatively, at some small angle from perpendicular, in order to reduce optical back-reflection from the optical fiber-air interface. When the empty ferrules are formed into a bundle it is preferable to align the ferrules widthwise, such that their faces align close to the final polish plane, to minimize material which must be removed during the polish procedure.

Figure 22:
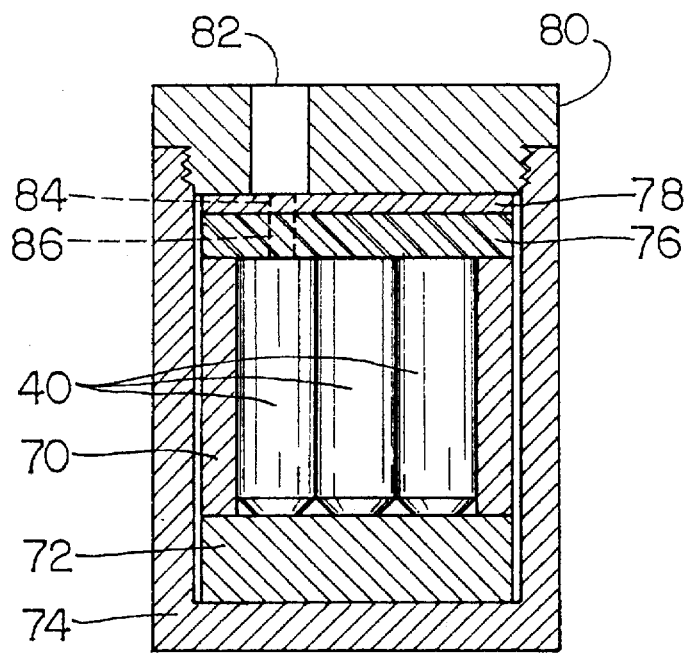
FIGS. 22–25 illustrate method steps in the manufacture of the connectors.

One embodiment of equipment to accomplish the alignment task is shown in FIG. 22. The ferrules 40 are held together by radial compressive member 70. The ferrules 40 are then abutted against a reference plate 72 held in an alignment fixture 74. A resilient gasket 76, which may be rubber, or similar material, is inserted on top of the ferrules 40, followed by a metallic plate 78. The entire stack inside fixture 74 is compressed by a cap 80 which is threaded into fixture 74. This compression forces ferrules 40 against the reference plate 72 and holds ferrules 40 until they can be immobilized as a unit. In the embodiment shown, this is accomplished by injecting epoxy into a hole 82 in cap 80 and through holes 84, 86 in plate 78 and gasket 76. The holes in the plate or gasket can be configured to control which interstices between ferrules epoxy is injected into. Thus, one may selectively inject some interstices and not others.

Figure 23:
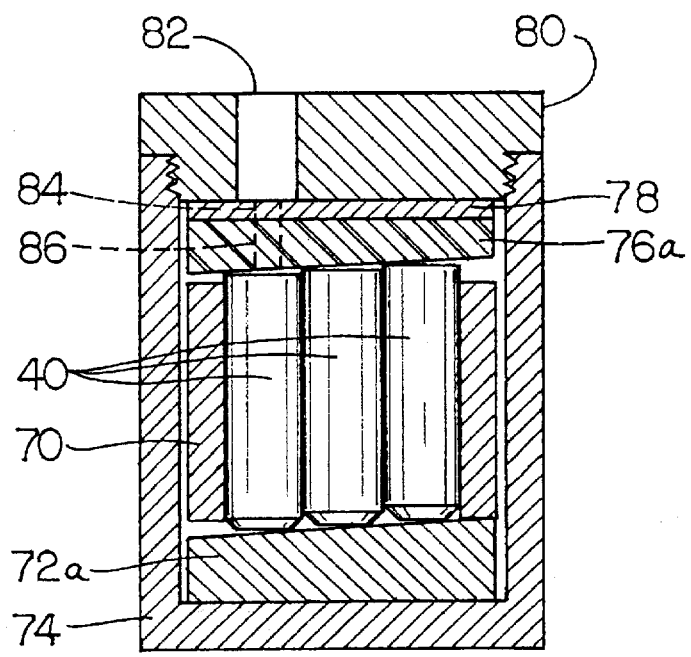

FIG. 23 illustrates fixture 74 to form a connector with an angled face. An angled reference plate 72a is used in conjunction with an angled gasket 76a. Such serves to force ferrules 40 against reference plate 72a in such a way as to form an angled face on the ferrule bundle.

Figure 24:
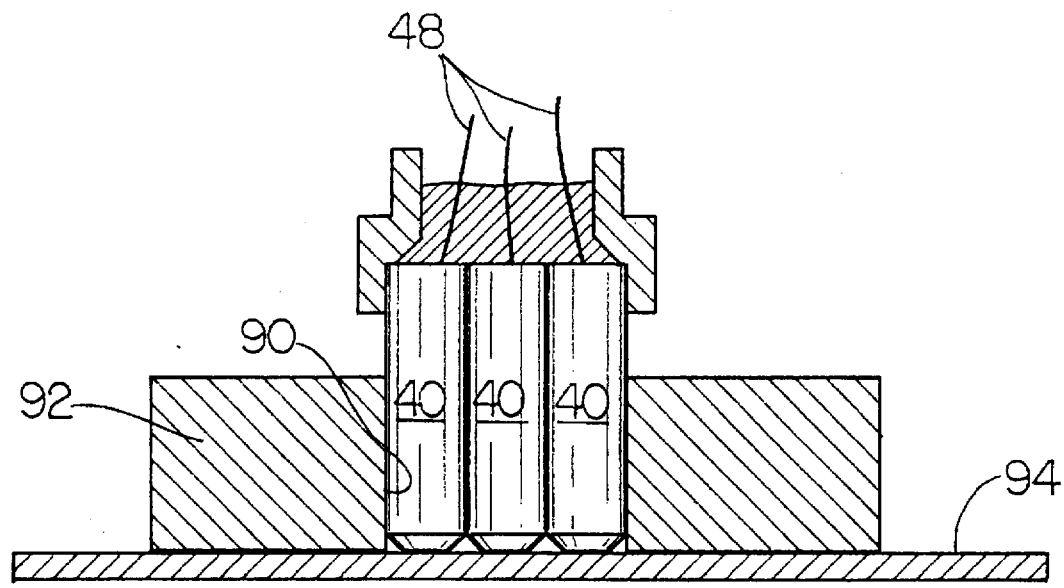
Figure 25:
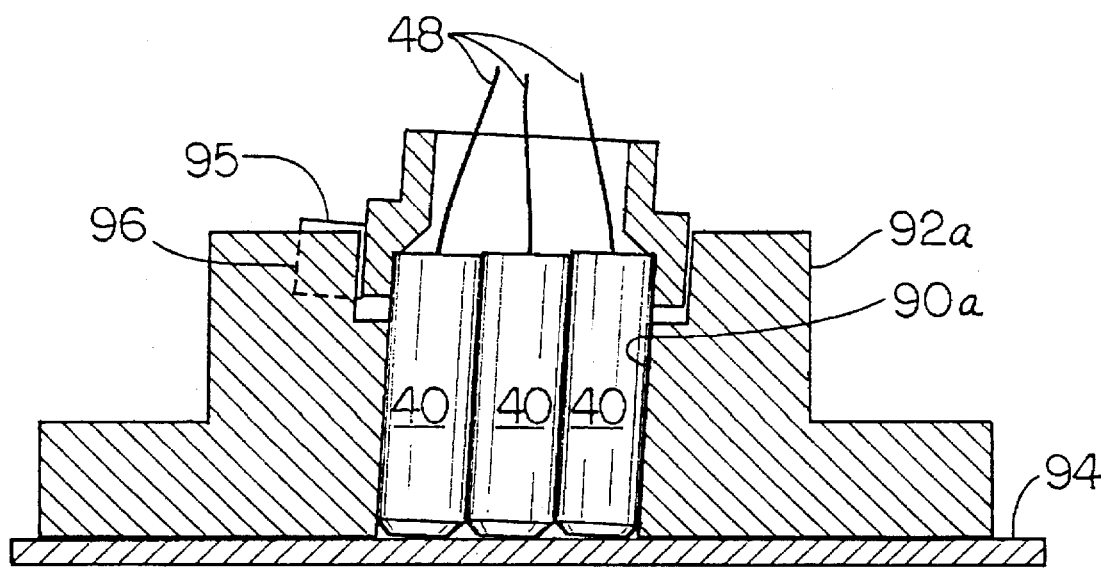

The accuracy of the bundle face angle must be maintained during polishing after the fibers have been epoxied into the connector. FIG. 24 shows a typical ferrule assembly for a flat polish with optical fibers 48 epoxied in place. To polish the ferrule faces, the ferrule bundle is inserted in a tight-fitting round hole 90 in polish fixture 92. The hole 90 is perpendicular to a surface 94 of polish fixture 92. FIG. 25 shows a polish fixture 92a used for angle polished ferrules. The ferrules 40 are inserted in a close fitting non-round hole 90a in polish fixture 92a. The shape of the hole 92a depends upon the configuration of the connector and serves to provide azimuthal keying. For example, in a hexagonal seven channel ferrule bundle, hole 90a is hexagonal. The hole 90a is oriented in polish fixture 92a with the axis of the hole 90a at a predetermined angle to the surface 94 of the polish fixture. A rough key 95, which is part of the ferrule assembly, is aligned to fit within a slot 96 in polish fixture 92a. Such interengagement determines the proper one of the multiple symmetrical positions in which ferrules 40 may be inserted in polish fixture 92a.

Figure 26:
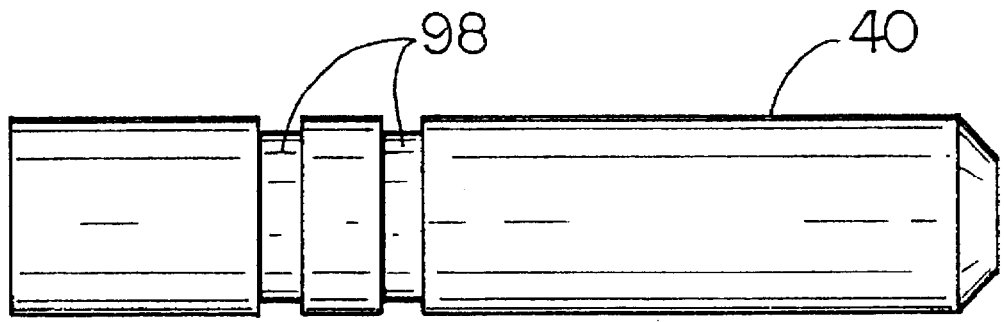
FIGS. 26–28 show alternative embodiments of single-channel ferrules for use in the multi-channel connectors herein.
Figure 27:
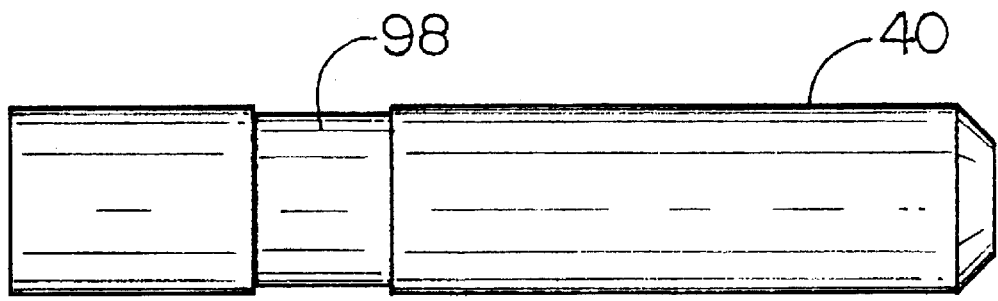
Figure 28:
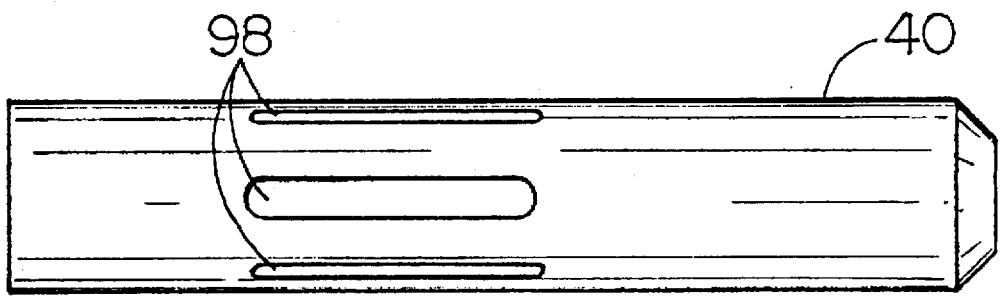

Improved bonding of the ferrules in a connector is possible by etching, grinding, or machining portions 98 of the ferrule bodies, as is shown in FIGS. 26–28. This provides improved epoxy bonding relative to the normal ferrule which has highly polished sides.

Thus, there is provided a connector for a plurality of single-channel fiber-optic ferrules, which connector facilitates simultaneous and precision connections of the plurality of optical fibers, and which connector is of smaller size than connectors having the same number of single channel ferrules mounted in a free-floating manner. There is further provided a relatively inexpensive method for manufacturing such connectors, which method requires a relatively short time expenditure.

It is to be understood that the present invention is by no means limited to the particular constructions herein disclosed and/or shown in the drawings, but also comprises any modifications or equivalents within the scope of the claims.

What is claimed is:

1. A fiber-optic connector comprising:

a plurality of ferrules, each of said ferrules having extending centrally therethrough a single optical fiber;

means abutting at least all peripheral ones of said ferrules for exercising a radially compressive force on said all peripheral ones of said ferrules and a remainder of said plurality of ferrules for urging sad plurality of ferrules into a configuration in which said plurality of ferrules are coparallel and nested so as to form a stable bundle which in transverse section is substantially axisymmetrical, and retaining said plurality of ferrules in said configuration; and alignment structure for angular positioning of said plurality of ferrules in said connector in said transverse section about a nominal longitudinal axis of said bundle for registry of said connector with a second connector of complementary configuration.

2. The fiber-optic connector in accordance with claim 1, wherein said means for exercising a radially compressive force on said plurality of ferrules comprises a sleeve disposed around said peripheral ferrules.

3. The fiber-optic connector in accordance with claim 1, wherein said means for exercising a radially compressive force on said plurality of ferrules and for retaining said plurality of ferrules in said configuration comprises a sleeve disposed around said peripheral ferrules.

4. A fiber-optic connector comprising:

a plurality of ferrules, each of said ferrules having extending centrally therethrough only one optical fiber;

a sleeve surrounding said ferrules, abutting all peripheral ones of said ferrules, and exercising a radially compressive force on said plurality of ferrules to urge said ferrules into a configuration in which said plurality of ferrules are coparallel and nested so as to form a stable bundle which in transverse section is substantially axisymmetrical;

means for retaining said plurality of ferrules in said configuration; and alignment structure for angular positioning of said plurality of ferrules in said connector in said transverse section about a nominal longitudinal axis of said bundle for registry of said connector with a second complementary connector.

5. A fiber-optic connector assembly comprising:

a first connector having a plurality of ferrules, each of said ferrules having extending centrally therethrough only one optical fiber;

a sleeve surrounding said ferrules, abutting all peripheral ones of said ferrules, and exercising a radially compressive force on said plurality of ferrules to urge said plurality of ferrules into a configuration in which said plurality of ferrules are coparallel and nested so as to form a stable bundle which in transverse section is substantially axisymmetrical;

means for retaining said plurality of ferrules in said configuration;

alignment structure for angular positioning of said plurality of ferrules in said connector in said transverse section about a nominal longitudinal axis of said bundle for registry of said first connector with a second complementary connector; and an alignment sleeve adapted to receive and retain said first connector and said second connector in axial alignment and in abutting relationship.

6. A fiber-optic connector assembly comprising:

a first connector having a plurality of single-channel ferrules, each having extending centrally therethrough a single optical fiber;

means abutting all peripheral ones of said ferrules for exercising a radially compressive force on said plurality of ferrules for urging said plurality of ferrules into a configuration in which said plurality of ferrules are coparallel and nested so as to form a stable bundle which in transverse section is substantially axisymmetrical, and retaining said plurality of ferrules in said configuration;

alignment structure for angular positioning of said plurality of ferrules in said connector in said transverse section about a nominal longitudinal axis of said bundle for registry of said first connector with a second connector of complementary configuration; and an alignment sleeve adapted to receive and retain said first connector and said second connector in axial alignment and in abutting relationship.

7. The fiber-optic connector in accordance with claim 6, wherein said means for exercising said radially compressive force on said plurality of ferrules comprises a sleeve surrounding said peripheral ferrules.

8. The fiber-optic connector assembly in accordance with claim 6, wherein said alignment structure comprises a ring of ferrule-like rods fixed to the inside wall of said alignment sleeve and abutting each other side-by-side, said rods defining a central area in said alignment sleeve adapted to receive said first and second connectors having a selected number of ferrules disposed at a selected azimuthal attitude.

9. The fiber-optic connector assembly in accordance with claim 6, wherein:

said alignment structure comprises a positioning ferrule of the same configuration and size as any of said plurality of ferrules;

said positioning ferrule extending from said first connector for engagement with a recess in said second connector;

said recess in said second connector being of the same configuration and size as one of said plurality of ferrules and further being adapted to receive said positioning ferrule in said second connector; and said positioning ferrule being disposed in said alignment sleeve when said first connector and said second connector are joined.

10. The fiber-optic connector assembly in accordance with claim 6, wherein:

said alignment structure comprises precision rod means fixed to one of said first connector and said second connector and recess means in the other of said first connector and said second connector; and said recess means being substantially of the same size and configuration as said rod means, such that when said first connector and said second connector are joined in said alignment sleeve, said rod means extends from one of said first connector and second connector into the other of said first connector and said second connector.

* * * * *